J. HOLLINGSWORTH.
Horse Rake.
No. 48,944.
2 Sheets—Sheet 1.
Patented July 25, 1865.
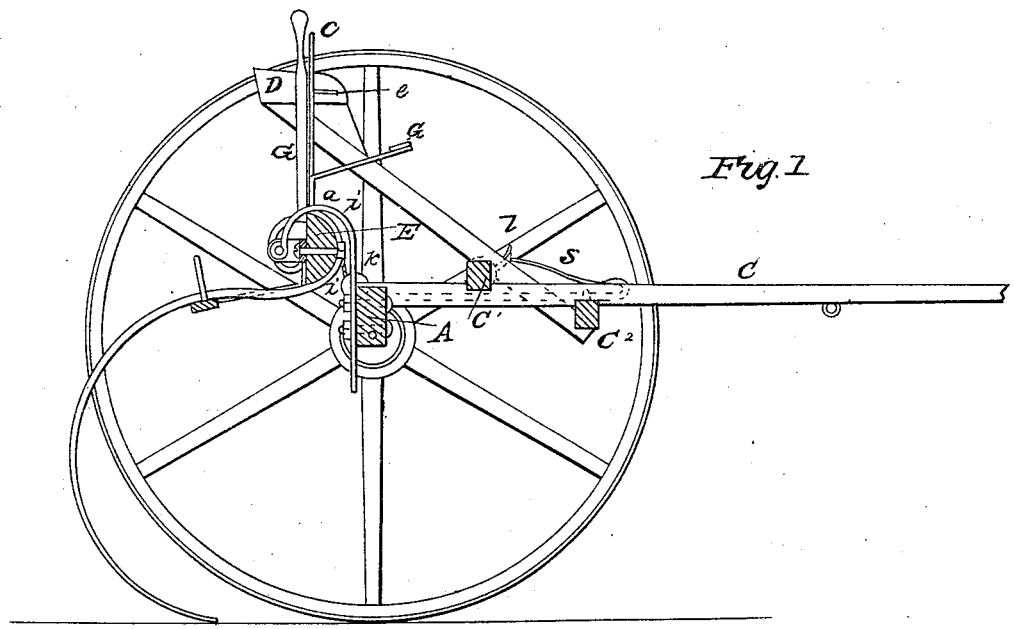
Fig. 1
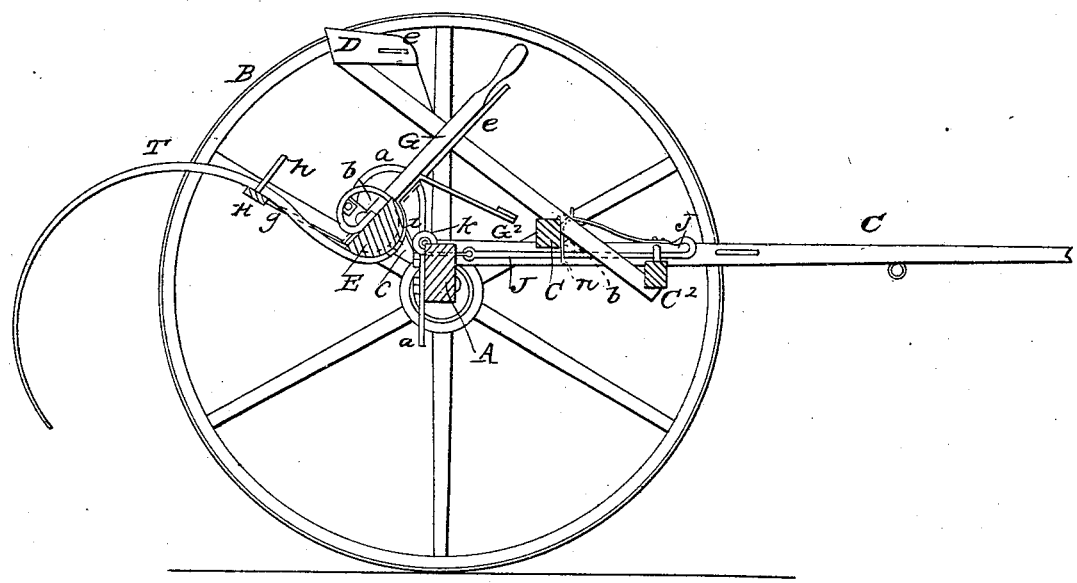

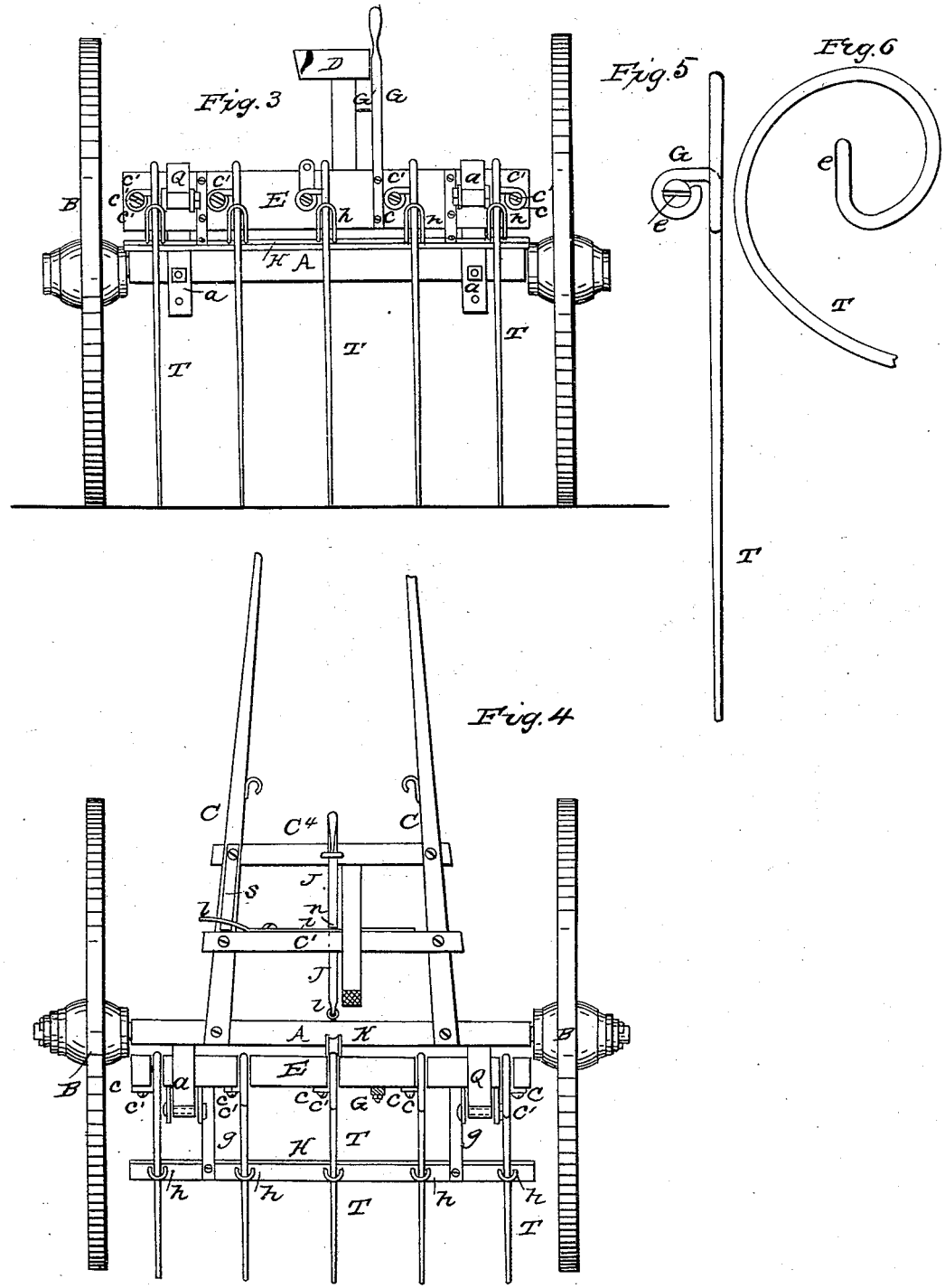

UNITED STATES PATENT OFFICE.

J. HOLLINGSWORTH, OF CHICAGO, ILLINOIS.

IMPROVEMENT IN HORSE-RAKES.

Specification forming part of Letters Patent No. 48,944, dated July 25, 1865.

*To all whom it may concern:*

Be it known that I, J. HOLLINGSWORTH, of Chicago, Cook county, State of Illinois, have invented a new and Improved Horse Hay-Rake; and I do hereby declare that the following is a full, clear, and exact description thereof, reference being had to the accompanying drawings, making a part of this specification, in which—

Figure 1, Sheet 1, is a vertical section through the rake, showing the teeth in a raking position. Fig. 2, Sheet 1, shows the teeth thrown up out of raking position. Fig. 3, Sheet 2, is an elevation of the rear end of my machine. Fig. 4, Sheet 2, is a plan view. Figs. 5 and 6 show the form of the teeth of the rake.

Similar letters of reference indicate corresponding parts in the several figures.

To enable others skilled in the art to make and use my invention, I will describe its construction and operation.

In the accompanying drawings, A represents the axle of two transporting-wheels, B B; and C C are the thills, which are secured at their rear ends rigidly to the axle A, and which support, by means of cross-bars $C'$ $C^2$, the inclined standard of the driver's seat D, as shown clearly in Figs. 1 and 2. The driver's seat is extended back of the axle-tree, so that the driver will be in a convenient location for operating the rake, as well as to control his horse.

Two curved supports, $a\ a$, are secured to the back part of the axle-tree by means of bolts and nuts, or in any other suitable manner which will admit of these supports being adjusted up or down for the purpose of regulating the teeth to the work required, as gleaning stubble, &c. These supports $a\ a$ are bent in the form of goose-necks, and their overhanging ends have eyes formed on them to receive the bolts which pivot the semi-cylindrical rake-head E to said supports. The head E has bearings $b\ b$ secured to its flat side, and the pivot-bolts pass through these bearings and through the eyes of the curved supports, and thus make the connection of the rake-head to the latter.

The rake-teeth T, which are attached to the head E, are constructed with scroll-springs formed on their upper ends, through which scrolls the bar E passes, as shown in Figs. 1, 2, and 4.

I desire to employ the scroll-teeth in my machine, and to form the scrolls in such manner that they shall be stayed laterally within grooves formed in their oscillating head or bar and serve as springs for giving greater elasticity to the teeth, and also to enable me to remove any one or all of the teeth from their oscillating bar or head E without detaching this bar from its supports, so that should one of the teeth become broken it can be quickly removed and another tooth introduced in its stead. To effect this object with a bar, E, circumferentially grooved and supported and arranged near the axle-tree A, as above described, the upper end of each tooth is curved, as represented in Figs. 5 and 6, so as to form a scroll of one half-turn. The end $c$ of the tooth is then bent at right angles to the plane of the scroll, and an eye formed on it to receive a bolt, $c'$, which passes through the rake-bar and secures the end $c$ to the flat side of this bar, as shown in Figs. 1, 2, and 3.

The space between the eye $c$ and the curved or scroll portion of the tooth should be slightly greater than the shortest width of the bar E, for the purpose of admitting this bar within the scroll without bending the latter. Such a tooth is applied to the bar E in the following manner:

The tooth is held in a diagonal position to the axle A and bar E, and in this position the scroll end is passed up between said axle and bar. It is then brought at right angles to the latter, and its point or raking end carried forward and upward until the eye $c$ projects over the flat side of the bar E, when the point of the tooth is then moved back to a position which it is to occupy when secured to said bar. The eye $c$ being adjusted in a proper position to receive the bolt, the tooth is secured in position as above described.

In the curved surface of the rake-bar E, I make grooves to receive the scroll portions of the teeth and prevent them from lateral displacement. The teeth thus bent and applied to the head or bar E do not have their scroll portions opened by the resistance offered by the hay to their raking ends; but such resistance tends to close the scrolls. This results from the passing of the raking ends of the teeth under the bar or head E instead of over it. By having the resistance tend to close the scrolls of the teeth the effective elastic resistance of the teeth is greatly enhanced and the teeth are kept snugly on their laterally-staying grooved head or bar E.

Another improvement in scroll rake-teeth which I have made consists in making the teeth T of round rods of metal, and in the following-described form: I make a gradual reduction of the diameter to commence very near the scroll-shaped end, and therefrom to continue to the end of the tooth; or the tooth may be gradually reduced from one end to the other. This reduction does not destroy the cylindric shape of the metal of which the tooth is formed. I now flatten the tooth in a lateral direction at that end where the scroll is to be formed, so as to give it a wide bearing, and also make it quite elastic. Thus flattened, it is bent into a scroll form, so as to fit around the head E and enter the groove provided in said head for its reception, as represented. By thus constructing the teeth I secure strength where it is most needed or required, and yet make the teeth sufficiently elastic to prevent them from readily breaking and sufficiently light to admit of their being easily elevated.

G represents a lever, which is secured rigidly to the flat side of the rake-bar E, on one side of the driver's seat D, and projects up sufficiently high to enable the driver to grasp its upper end and vibrate the teeth while sitting in his seat. To this lever G a treadle, G', is applied, which will enable the driver to use his foot in elevating the points of the rake-teeth from the ground. In addition to this treadle, a spring-latch, e, is applied to the lever G for catching behind the projection e' on the driver's seat and locking the rake down in working position. When it is desired to throw the rake out of working position, as shown in Fig. 2, the latch e is released from its catch e' and the lever G moved forward and downward, which operation causes the points of the rake-teeth to move backward and upward, so as to leave the load of hay without lifting any portion of it from the ground. The teeth are all moved bodily backward in the act of lifting them up to free them of their load.

H represents a horizontal transverse bar, which is sustained upon the rear extremities of arms g g, which are secured to and project out in rear of the rake-bar E, as shown in Figs. 3 and 4. This bar H is provided with a number of staples, h, through which the teeth of the rake pass, as shown in the above-mentioned figures; and thus arranged, the staples serve as rear guides and lateral stays for keeping the teeth always in proper position.

In connection with the hand-lever for enabling the driver to raise or to depress the rake, I have applied to the machine a contrivance by which the driver can avail himself of the power of the horse to elevate the rake-teeth and discharge the load of hay.

J represents a longitudinally-sliding rod, having a hook formed on its forward end and an eye on its rear end. This rod J is sustained at an intermediate point between the thills C by the cross-bars C' C², as shown in Figs. 2 and 4, and to its forward hooked end the horse is attached in any suitable manner. A chain, $i$, (shown in red lines, Figs. 1 and 2,) is attached at one end to the rear end of the bar J, and at the other end to the upper edge of the oscillating rake-bar E. Said chain being passed under the grooved pulley $k$ on the axle A, it will elevate the rake when the rod J is moved forward and allow the rake-teeth to fall when rod J is released. A notch is formed in the rod or bar J at $n$ to receive the forked end of a lever, $l$, the opposite end of which lever is acted upon by a spring, $s$. (Shown in Fig. 4.) Spring $s$ forces the forked end of the lever $l$ (which is pivoted to bar C') down upon the rod J, and retains this rod in position until released by the operator pressing his foot upon the outer end of said lever. By such an arrangement the driver can employ the power of his team to raise the rake out of raking position and discharge the load.

What I claim as my invention, and desire to secure by Letters Patent, is—

1. A scroll rake-tooth constructed with the transverse eye $c$, arranged relatively thereto, substantially as herein described and represented, for the purpose set forth.

2. The arrangement of the scroll-teeth upon a continuous head or bar, E, which is hung to the axle-tree A in such manner that they enter grooves in the head E, so as to be stayed laterally, and pass under the head E, and at the same time are susceptible of being removed and replaced independently of one another, substantially as herein described and shown.

3. The arrangement of the foot and hand lever G G', adjustable goose-neck brackets $a\ a$, oscillating head E, and axle-tree A, in the manner and for the purpose described.

4. The arrangement of the rod J, forked lever $l$, spring $s$, pulley $k$, chain or cord $i$, goose-neck brackets $a\ a$, head E, and foot and hand lever G G', substantially in the manner and for the purpose described.

5. The arrangement of the hand and foot lever directly on the rake-head E, which is hung in goose-neck brackets $a\ a$, substantially in the manner described.

6. The combination of the goose-neck brackets $a\ a$, slide-rod J, and rake-head E, in the manner and for the purpose described.

JAMES HOLLINGSWORTH.

Witnesses:
CHAS. H. BARNUM,
H. B. STEVENS.